United States Patent [19]
Katchka

[11] 3,861,587
[45] Jan. 21, 1975

[54] THERMOSTATIC FLOW CONTROL DEVICE

[75] Inventor: Jay R. Katchka, Cypress, Calif.

[73] Assignee: Robertshaw Controls Company, Richmond, Va.

[22] Filed: Aug. 15, 1973

[21] Appl. No.: 388,693

[52] U.S. Cl. ............ 236/1 H, 236/15 A, 236/68 D, 431/54
[51] Int. Cl. ............................................. F23q 9/08
[58] Field of Search .......... 236/1 H, 15 A, 99, 680; 431/54

[56] References Cited
UNITED STATES PATENTS
2,387,164 10/1945 McCarty ............................ 236/1 H
2,874,904 2/1959 Schwalbach ...................... 236/1 H

*Primary Examiner*—W. F. O'Dea
*Assistant Examiner*—Peter D. Ferguson
*Attorney, Agent, or Firm*—Anthony A. O'Brien

[57] ABSTRACT

A thermostatic flow control device including a safety valve and a thermostatic valve controlling flow between an inlet and main and pilot outlets in a casing, and a selector dial for moving a cam member within the casing, the safety and thermostatic valves each having an axially movable member engaging a cam surface of the cam member such that movement of the cam member provides simultaneous pilot and on-off control of the safety and thermostatic valves.

15 Claims, 4 Drawing Figures

THERMOSTATIC FLOW CONTROL DEVICE

BACKGROUND OF THE INVENTION

1. Field of the Invention

The present invention pertains to thermostatic flow control devices and, more particularly, to such devices providing pilot and on-off control utilizing only a safety valve and a thermostatically operated valve.

2. Description of the Prior Art

Conventional thermostatic flow control devices, such as those utilized with water heaters and various other heating and cooling appliances to control the flow of fuel to a burner, normally use a manual on-off valve to select conditions for the control device as well as a safety valve and a thermostatically operated valve. The safety valve is utilized to prevent fuel flow through the control device when there is no flame at a pilot burner, and the thermostatically operated valve is normally positioned downstream of the manual on-off valve to supply fuel to the main burner under temperature demand. In control devices for water heaters, for instance, a rod and tube thermostat is normally utilized to operate the thermostatically operated valve with the thermostat extending into the tank of the water heater to sense water temperature whereas thermostatically operated valves in control devices for heating and cooling appliances, such as furnaces and air-conditioning units, are normally operable in response to space thermostats which control the supply of electricity to a valve operator, such as a heat motor.

Conventional manual on-off valves take the form of gas cocks or plugs cooperating with conical valve seats or valve discs; and, thus, such manual valves must be precisely formed and frequently require machining thereby greatly increasing production costs. The controls industry has long sought a practical means of eliminating the manual on-off valve; and, to this end, the embodiment of FIG. 2 of U.S. Pat. No. 3,343,557 to Dunn is exemplary of prior art control devices not utilizing a manual on-off valve. It should be noted, however, that such prior art control devices have sacrificed complete on-off control for reduction in production costs; and, thus, in order to regain the sacrificed complete on-off control, a plug valve is incorporated in the embodiment of FIG. 6 of U.S. Pat. No. 3,343,557 thereby reverting to the structure of conventional thermostatic flow control devices and their concommitant expensive production. U.S. Pat. No. 2,387,164 to McCarty is exemplary of another prior art control device eliminating the manual on-off valve; however, this control device has the disadvantage of requiring complex mechanical linkages and thereby failing to reduce production costs to the extent desired.

U.S. Pat. No. 3,685,730 to Katchka discloses a thermostatic flow control device successfully eliminating the need for a manual on-off valve by providing control with a safety valve and a thermostatic valve. However, while the thermostatic flow control device of U.S. Pat. No. 3,685,730 has been found to effectively provide complete pilot and on-off control, the structure of the thermostatic flow control device requires precise mounting of a pair of operator levers within the casing to be provided by a selector knob to control the safety valve and the thermostatic valve; and, thus, the structure of the thermostatic flow control device is not as simple and low in cost as is desired.

SUMMARY OF THE INVENTION

The present invention is generally summarized in a thermostatic flow control device including a casing having an inlet adapted to receive fuel from a source, an outlet adapted to supply the fuel to a burner, and a flow passage disposed between the inlet and the outlet; a safety valve including a safety valve seat disposed in the flow passage, a safety valve member cooperating with the safety valve seat to control fuel flow through the flow passage and first axially movable means controlling movement of the safety valve member, safety means controlling operation of the safety valve in response to the existence of a flame at the burner; a thermostatic valve including a thermostatic valve seat disposed in the flow passage, a thermostatic valve member cooperating with the thermostatic valve seat to control fuel flow through the flow passage, and second axially movable means controlling movement of the thermostatic valve member; a thermostat controlling operation of the thermostatic valve in response to temperature variations; and selector means for simultaneously controlling the safety valve and the thermostatic valve including a cam member having cam surfaces engaging the first and second axially movable means to control axial movement thereof.

Accordingly, it is a primary object of the present invention to overcome the above-mentioned disadvantages of the prior art by providing a thermostatic flow control device requiring only a thermostatic valve and a safety valve to provide complete pilot and on-off control while utilizing simple structure.

Another object of the present invention is to simultaneously control thermostatic and safety valves having parallel axes of operation by means of a single rotatable cam member.

A further object of the present invention is to rotatably dispose a cam disc within the casing of a thermostatic flow control device to control axial movement of members operating a safety valve and a thermostatic valve, the cam disc having cam surfaces with varying levels to engage and axially move the members such that the thermostatic and safety valves can be simultaneously controlled by rotation of the cam disc.

The present invention has an additional object in that a cam disc is provided with a cam surface having a slot therein through which is received an axially movable, safety valve operator and a cam surface for axially moving a thermostatic valve operating member, the safety valve operator being axially controlled by the cam disc and movable to a pilot reset position by means of a reset button axially aligned therewith.

Some of the advantages of the present invention over the prior art are that the need for a manual on-off valve is eliminated, complete pilot and on-off control is provided by a single cam member controlling axially movable, valve operating members, and material and assembly costs of the thermostatic flow control device are reduced.

Other objects and advantages of the present invention will become apparent from the following description of the preferred embodiment taken in conjunction with the accompanying drawings.

DESCRIPTION OF THE PREFERRED EMBODIMENT

Figure 1:
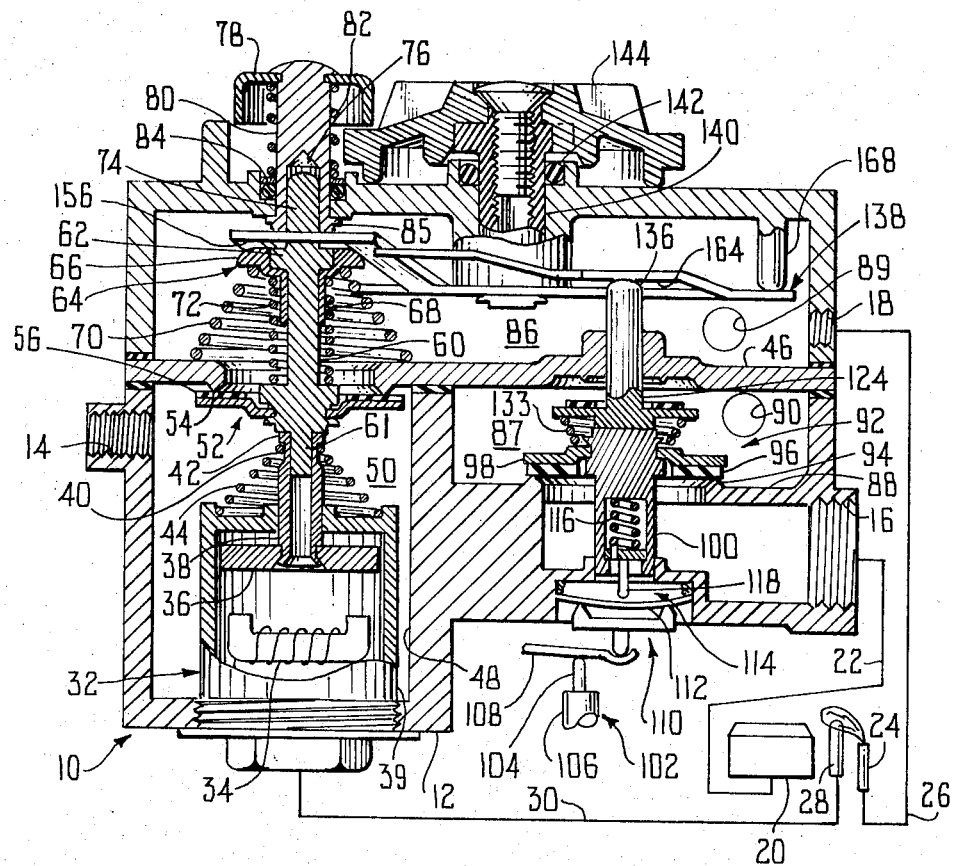
FIG. 1 is a front elevation, partly in section, of a thermostatic flow control device according to the present invention in an off condition.
Figure 3:
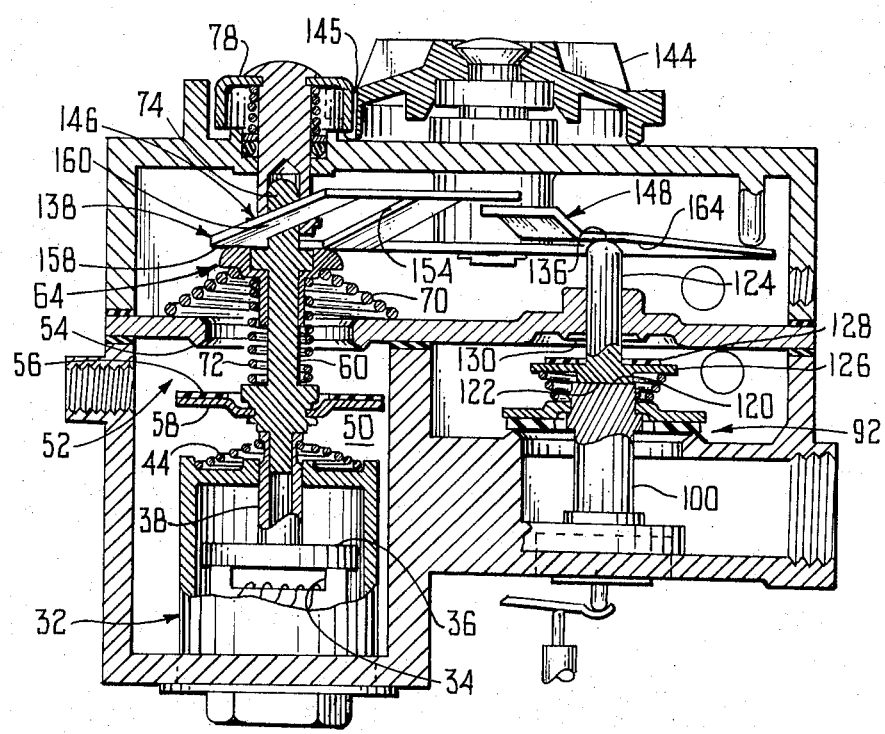
FIG. 3 is a front elevation partly in section, of the thermostatic flow control device of FIG. 1 in a pilot condition.
Figure 4:
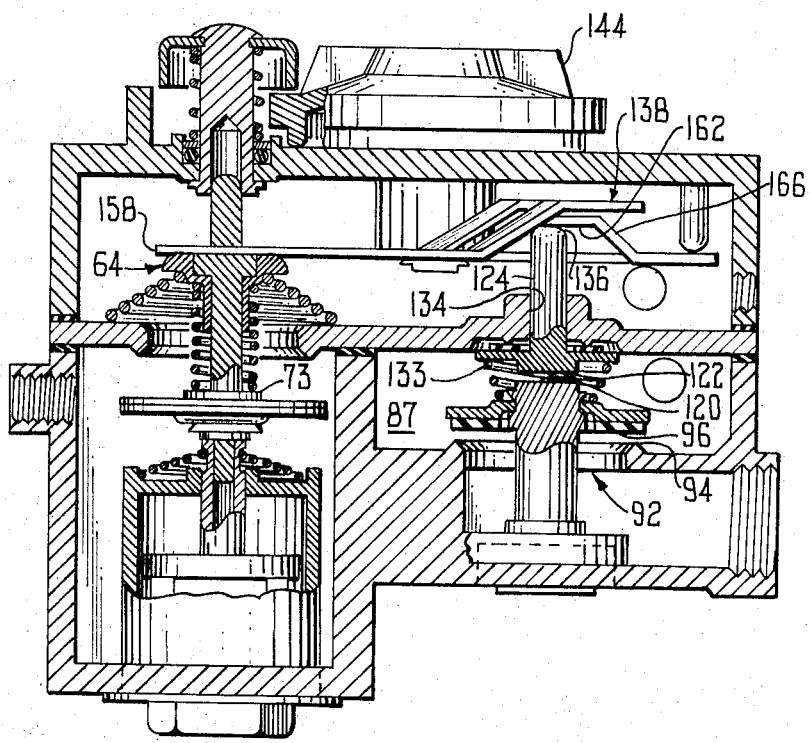
FIG. 4 is a front elevation partly in section of the thermostatic flow control device of FIG. 1 in an on condition.

A thermostatic flow control device 10 according to the present invention, as illustrated in off, pilot and on conditions in FIGS. 1, 3 and 4, respectively, includes a casing 12 having an inlet 14 adapted to receive fuel from a source, such as a gas supply (not shown), a main outlet 16 and a pilot outlet 18 with a flow passage through the casing 12 to permit the selective supply of fuel from the inlet 14 to the main outlet and the pilot outlet. Main outlet 16 communicates with a main burner 20 through a conduit 22, and pilot outlet 18 communicates with a pilot burner 24 through a conduit 26. A flame sensor in the form of a thermocouple 28 is disposed in flame sensing proximity to pilot burner 24 and is electrically connected by means of a cable 30 to an electromagnetic safety device 32 mounted in casing 12.

The electromagnetic safety device 32 includes an electromagnet 34 and an armature 36 carried on a tubular stem 38 slidably extending through an opening of a top wall of a housing 39 for the electromagnetic safety device 32. The stem 38 has an annular notch 40 formed in the outer surface thereof near an upper end 42, and a coiled spring 44 is mounted in compression between the top wall of the housing 39 and the notch 40 to bias the stem 38 and the armature 36 away from the electromagnet 34.

Casing 12 has a wall 46 therein cooperating with a wall 48 to define an inlet chamber 50 in which electromagnetic safety device 32 is disposed, and a safety valve 52 includes an annular valve seat 54 formed on wall 46 and an annular resilient valve member 56 carried by a flange 58 extending transversely from the longitudinal axis of an axially movable operator 60 having a reduced diameter protrusion 61 slidably received within stem 38 at end 42. Operator 60 has a collar 62 extending therearound to form a stop, and a cam follower 64 has a cup-shaped portion 66 surrounding collar 62 and a tubular extension 68 slidably mounted on the shaft of operator 60 such that the cam follower 64 is slidable relative to the operator 60 limited by the collar 62. A coiled cam follower spring 70 is mounted in compression between the cup-shaped portion 66 of the cam follower 64 and wall 46, and a coiled valve opening spring 72 is mounted in compression between the cup-shaped portion 66 of the cam follower and an annular shoulder 73 adjacent flange 58 of the operator 60. The operator 60 has an end 74 received within a hollow 76 formed in the end of a reset button 78 having a shaft 80 extending through an outer wall of the casing 12 and biased away from the casing by means of a coiled spring 82 mounted in compression. An O-ring 84 provides a gas-tight seal with the shaft 80, and a collar 85 extends transversely from the axis of the shaft 80 to limit upward movement thereof.

Wall 46 defines, with the top wall of the casing 12, a chamber 86 which communicates with a chamber 87 defined by a wall 88 extending transversely from wall 48 through ports 89 and 90 and a pressure regulator (not shown) to provide a flow passage from inlet 14 through valve seat 54 and chamber 86 to pilot outlet 18 and from chamber 86 through the pressure regulator and chamber 87 to a thermostatic valve 92.

Thermostatic valve 92 includes an annular valve seat 94 formed on wall 88 and a resilient annular valve member 96 carried on a disc 98 extending transversely from a valve stem 100 which is axially movable in response to operation of a conventional rod and tube thermostat 102 in which a rod 104, having a relatively low coefficient of thermolinear expansion, is concentrically disposed in a tube 106, having a relatively high coefficient of thermolinear expansion, with the ends of the rod and tube joined, such as by welding. Rod and tube thermostat 102 is suitable mounted to extend into a medium to be controlled and to have the free end of rod 104 engage a lever 108 which operates a clicker mechanism 110 by means of a round plate having an annular fulcrum engaging a clicker disc 112. Clicker disc 112 is adapted to snap over center in response to linera movement of rod 104 such that thermostatic valve 92 is operated with snap action in response to thermostat 102. The valve stem 100 is hollow and carries an override mechanism 114 including a coiled spring 116 mounted in compression between the bottom of the hollow portion of the stem 100 and a piston-like member 118 having a rod extending from the end of stem 100 and adapted to be engaged by clicker disc 112. Valve stem 100 has an end 120 abutting an end 122 of an axially movable plunger 124 carrying a transversely extending flange 126 with a resilient washer 128 thereon adapted to seat on an annular rib 130 extending from wall 46 to seal chamber 86 from chamber 87 when the thermostatic flow control device 10 is in the on condition. A coiled spring 133 is mounted in compression between disc 98 and flange 126 to bias plunger 124 away from valve stem 100. The wall 46 has a bore 134 therein to slidably receive plunger 124, and the axes of plunger 124 and stem 100 are aligned, with the common axis thereof in parallel alignment with the axis of the operator 60 of the safety valve 52. The plunger 124 has a rounded end 136 which operates as a cam follower surface riding on a cam member 138.

Figure 2:
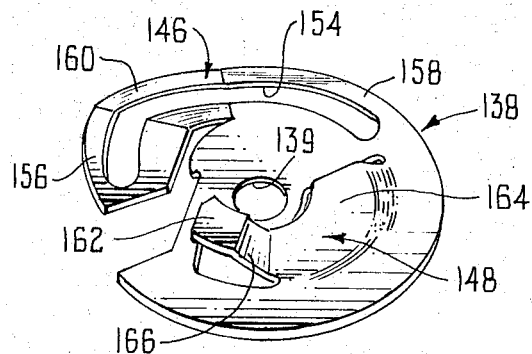
FIG. 2 is a perspective view of the cam member of the thermostatic flow control device of FIG. 1.

Cam member 138 has a circular or disc-like multi-level configuration with a central aperture 139 keyed to an end of a shaft 140 extending through the top wall of casing 12 with a gas tight seal provided by an O-ring 142, and the external end of shaft 140 is fixed to a selector dial 144 carrying indicia corresponding to conditions of the thermostatic flow control device 10. The cam member 138, as best illustrated in FIG. 2, has a pair of arcuately arranged cam surfaces 146 and 148 formed thereon. Cam surface 146 engages cam follower 64 and has an arcuate slot 154 formed therein having a width to receive the end 74 of operator 60 as well as collar 62, and the cam surface 146 has a high level portion 156 and low level portion 158 joined by a sloping ramp 160. The cam surface 148 engages the cam follower end 136 of plunger 124 and has a high level portion 162 joining a low level portion 164 through a sloping ramp 166. The cam disc 138 is rotatably disposed in the casing 12 such that cam surfaces 146 and 148 control safety valve 52 and thermostatic valve 92 by controlling axial movement of operator 60 and plunger 124, respectively, and the cam disc 138 is held in position within the casing by being keyed to shaft 140 and by contact with a cam support post 168 depending from the top wall of the casing 12 to engage the cam disc near its periphery.

The operation of the thermostatic flow control device 10 will be described with reference to FIGS. 1, 3 and 4 wherein the thermostatic flow control device is illustrated in the off, pilot and on conditions, respectively. As illustrated in FIG. 1 when the thermostatic flow control device 10 is in the off condition selector dial 144 and cam disc 138 are rotated to an off position such that cam follower 64 rides on the high level portion 156 of cam surface 146 and the cam follower end of plunger 124 rides on the low level portion 164 of cam surface 148. The spring 70 has sufficient strength such that the cam follower 64 will be biased to ride on the cam surface 146; and, accordingly, operator 60 will be forced axially upward to cause valve member 56 to engage valve seat 54 and prevent flow of fuel from inlet 14 to chamber 86. Since the cam follower end 136 of plunger 124 engages the low level portion 164 of cam surface 148, the plunger 124 will force valve stem 100 axially downward to compress spring 133 and cause valve member 96 to engage valve seat 94. Thus, in the off condition, safety valve 52 is closed to prevent fuel flow to chamber 86 and pilot outlet 18, and thermostatic valve 92 is closed to further prevent any communication between chamber 86 and main outlet 16. Since there is no supply of fuel to pilot burner 24, thermocouple 28 will not sense a flame and electromagnet 34 will drop out such that spring 44 will cause stem 38 to abut operator 60 and add its force to the closure of safety valve 52. If the thermostatic flow control device 10 is placed in the off condition while there is a heat demand sensed by the thermostat 102, the thermostatic valve 92 will still be closed due to the lost motion taken up by compression of spring 116 in the override mechanism 114; and, similarly, any operation of the thermostat 102 in response to temperature changes of the medium being sensed will not operate to open the thermostatic valve 92 since movement of the clicker assembly 110 will be taken up by the spring 116 within the valve stem 100. With the selector dial 144 in the off position, the peripheral edge of the selector dial extends below the peripheral edge of reset button 78 thereby preventing the reset button from being depressed; and, accordingly, the mechanical interlock of the selector dial 144 and the reset button 78 prevents movement of valve member 56 away from valve seat 54 to open the safety valve 52.

In order to supply fuel to pilot burner 24, selector dial 144 is rotated to align "PILOT" indicia thereon with an index mark on the top wall of the casing 12 thereby rotating cam disc 138 to a pilot position, as shown in FIG. 3, such that cam follower 64 rides down ramp 160 to engage the low level portion 158 of cam surface 146 while the cam follower end 136 of plunger 124 remains in engagement with the low level portion 164 of cam surface 148. Thus, with the rotation of the selector dial 144 to the pilot position, the cam follower 64 will be depressed to slide along operator 60 and remove the force form cam follower spring 70 while operator 60 remains stationary to close the safety valve 52 due to the closing force from magnet spring 44, which is much stronger than valve opening spring 72, forcing stem 38 into engagement with the operator such that collar 62 and end 74 of the operator extend through the slot 154 in cam disc 138. The rotation of the selector dial 144 to the pilot position aligns a notch 145 in the peripheral edge thereof with the reset button 78 thereby removing the mechanical interlock between the reset button and the selector dial and permitting the reset button to be axially depressed into the casing 12. The depression of reset button 78 causes the shaft 80 to abut collar 62 and move the operator 60 against the force of spring 44 to open the safety valve 52 and move the armature 36 to seat on electromagnet 34. With the reset button 78 depressed, fuel is supplied from inlet 14 to pilot outlet 18 and through conduit 26 to pilot burner 24, and the pilot burner can thus be lit to establish a flame thereat. Thermocouple 28 will sense the flame at the pilot burner 24 to actuate the electromagnetic safety device 32 and lock-up the armature 36. Thus, safety valve 52 will remain open due to the force from valve opening spring 72 when reset button 78 is released to be returned to its normal position by spring 82. With the thermostatic flow control device 10 in the pilot condition, the thermostatic valve 92 is positively closed to permit safe lighting of the pilot burner in that fuel cannot be supplied to the main burner 20 during the pilot lighting operation; and, if no flame is established at the pilot burner, the magnet spring 44 will force operator 60 up to close the safety valve 52 since magnet spring 44 is much stronger than valve opening spring 72.

With a flame established at the pilot burner, the selector dial 144 can now be rotated to the on position, as shown in FIG. 4, to permit operation of the thermostatic valve 92 to control the flow of fuel to main burner 20. With the selector dial 144 and the cam disc 138 rotated to the on position, the cam follower 64 will remain biased against the low level portion 158 of cam surface 146 while the cam follower end 136 of plunger 124 will ride up ramp 166 to engage the high level portion 162 of cam surface 148. The movement of plunger 124 under the bias of spring 133 will, thus, space plunger 124 from valve stem 100 at ends 120 and 122 to provide sufficient space for operation of the thermostatic valve 92 under the control of thermostat 102. When there is a demand for heat as sensed by the thermostat 102 the clicker mechanism 110 will snap over center such that the disc 112 engages the pin of pistonlike member 118; and, since there is a space between the end 122 of plunger 124 and the end 120 of valve stem 100 and spring 116 is stronger than spring 133, the valve stem 100 will be moved by the thermostat to compress spring 133 and move valve member 96 away from valve seat 94 to open the thermostatic valve 92 and supply fuel to main burner 20 through main outlet 16 and conduit 22. Once the demand for heat has been satisfied, the clicker mechanism 110 will snap back over center to permit spring 133 to force valve stem 100 down and seat valve member 96 against the valve seat 94 to close the thermostatic valve 92 and stop the supply of fuel to main burner 20 while fuel is continuously supplied to the pilot burner 24 from chamber 86. If in the on condition the flame at pilot burner 24 is extinguished, the electromagnet 34 will drop out, and the force from spring 44 will overcome the force from valve opening spring 72 to move operator 60 up and close the safety valve 52 to stop the flow of fuel to both the pilot and main burners.

From the on position if it is desired to interrupt operation of the thermostatic flow control device 10, the selector dial 144 can be rotated back to the off position which will cause cam follower 64 to ride up ramp 160 to high level portion 156 of cam surface 146 while cam follower end 136 of plunger 124 will ride down ramp 166 to the low level portion 164 of cam surface 148 thereby placing the thermostatic flow control device 10 in the state illustrated in FIG. 1. The operator 60 is free to move upward along with cam follower 64 due to the sliding relationship of projection 61 within stem 38. Accordingly, the safety valve will be closed to stop the flow of fuel to pilot burner 24 and main burner 20, and the thermostatic valve 92 will be closed regardless of the condition of the thermostat 102 to prevent further flow of fuel to main burner 20. Once the thermocouple 28 has cooled due to the extinguishing of the flame at pilot burner 24, the electromagnetic safety device 32 will release armature 36 and permit the spring 44 to return stem 38 to the position illustrated in FIG. 1.

The thermostatic flow control device 10 can be modified, if pressure regulation is not desired, by forming openings in the wall 46 about the thermostatic valve 92 to provide direct access to chamber 87 without pressure regulation; and, similarly, the thermostatic flow control device 10 can be modified for other conventional components or functions. For instance, the override mechanism can be formed of flexible levers and the axially movable members controlling the safety valve and the thermostatic valve can have any desired configuration and orientation even though the present invention is particularly advantageous with the safety and thermostatic valves having parallel axes of operation.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. A thermostatic flow control device comprising a casing having inlet means adapted to receive fuel from a source, outlet means adapted to supply the fuel to a burner, a flow passage means disposed between said inlet means and said outlet means; safety valve means including a safety valve seat disposed in said flow passage means, a safety valve member cooperating with said safety valve seat to control fuel flow through said flow passage means, and first axially movable means controlling movement of said safety valve member; safety means controlling operation of said safety valve means in response to the existence of a flame at the burner; thermostatic valve means including a thermostatic valve seat disposed in said flow passage means, a thermostatic valve member cooperating with said thermostatic valve seat to control fuel flow through said flow passage means, and second axially movable means controlling movement of said thermostatic valve member; thermostat means controlling operation of said thermostatic valve means in response to temperature variations; and selector means for simultaneously controlling said safety valve means and said thermostatic valve means including a cam member having cam surfaces engaging said first and second axially movable means to control axial movement thereof, said cam member being rotatable to control said first and second axially movable means and including a disc-like configuration with said cam surfaces having varying arcuately arranged levels.

2. A thermostatic flow control device as recited in claim 1 wherein said first axially movable means includes an operator carrying said valve member, a cam follower slidably mounted on said operator, and means biasing said cam follower against said cam surfaces of said cam member.

3. A thermostatic flow control device as recited in claim 2 wherein said second axially movable means includes a valve stem carrying said valve member, a plunger movable to abut said valve stem, and means biasing said plunger against said cam surfaces of said cam member.

4. A thermostatic flow control device as recited in claim 3 wherein the axes of said first and second axially movable means are disposed in parallel relation.

5. A thermostatic flow control device as recited in claim 4 wherein said cam member has an arcuate slot therein, said operator has an end extending through said slot, and said safety means includes a reset button mounted on said casing in axial alignment with said operator and axially movable to abut said end of said operator and move said safety valve member away from said safety valve seat.

6. A thermostatic flow control device as recited in claim 5 wherein said selector means has on, off and pilot positions and includes means permitting axial movement of said reset button in said pilot position and preventing axial movement of said reset button in said on and off positions.

7. A thermostatic flow control device as recited in claim 6 wherein said safety means includes an electromagnet, an armature, a stem carrying said armature and means biasing said stem toward said operator to bias said safety valve member toward said safety valve seat.

8. A thermostatic flow control device as recited in claim 7 wherein said operator has a stop extending therefrom to limit sliding of said cam follower on said operator.

9. A thermostatic flow control device as recited in claim 8 wherein said thermostat means includes a member movable to move said valve stem in response to temperature and said thermostatic valve means includes an override mechanism carried by said valve stem to take up movement of said member of said thermostat means when said selector means is in said off and pilot positions to prevent opening of said thermostatic valve means by said thermostat means.

10. A thermostatic flow control device as recited in claim 1 wherein the axes of said first and second axially movable means are disposed in parallel relation.

11. A thermostatic flow control device as recited in claim 1 wherein said cam surfaces of said cam member include a first cam surface engaging said first axially movable means and having first and second level portions joined by a ramp and a second cam surface engaging said second axially movable means and having first and second level portions joined by a ramp, and said cam member is movable to control the portions of said first and second cam surfaces engaging said cam follower means to control axial movement of said first and second axially movable means.

12. A thermostatic flow control device as recited in claim 11 wherein said first cam surface has a slot extending through said first and second level portions and said ramp, and said first axially movable means includes an operator carrying said safety valve member and having an end extending through said slot.

13. A thermostatic flow control device as recited in claim 12 wherein said first axially movable means includes a cam follower slidably mounted on said operator and a spring means biasing said cam follower against said first cam surface, and said operator has a stop extending therefrom to limit sliding of said cam follower on said operator.

14. A thermostatic flow control device as recited in claim 11 wherein said selector means includes a shaft mounted in said casing and extending externally therefrom and a selector dial fixed to said shaft externally of said casing to selectively move said shaft, and said cam member is fixed to said shaft internally of said casing and movable therewith, said selector dial having an off position wherein said first axially movable means engages said first level portion of said first cam surface to close said safety valve means and said second axially movable means engages said first level portion of said second cam surface to close said thermostatic valve means, a pilot position wherein said first axially movable means engages said second level portion of said first cam surface to permit said safety valve means to be opened and said second axially movable means engages said first level portion of said second cam surface to close said thermostatic valve means, and an on position wherein said first axially movable means engages said second level portion of said first cam surface to permit said safety valve means to be opened and said second axially movable means engages said second level portion of said second cam surface to permit said thermostatic valve means to be opened.

15. A thermostatic flow control device as recited in claim 14 wherein said cam member is rotatable by said selector dial and said shaft between said off, pilot and on positions and has a disc-like configuration.

* * * * *